United States Patent [19]

Hawkins

[11] 4,108,548
[45] Aug. 22, 1978

[54] DEVICE FOR EXPOSING PHOTOGRAPHICALLY SENSITIZED SHEETS

[76] Inventor: Barbara Jean Hawkins, 1622 E. Clinton Ave., Fresno, Calif. 93704

[21] Appl. No.: 832,593

[22] Filed: Sep. 12, 1977

[51] Int. Cl.² .................... G03B 27/58; G03B 27/44
[52] U.S. Cl. ........................................ 355/74; 355/54
[58] Field of Search ............... 355/18, 64, 77, 75, 355/54, 72, 74

[56] References Cited

U.S. PATENT DOCUMENTS

| 2,654,289 | 10/1953 | Flynn | 355/74 X |
|---|---|---|---|
| 2,895,377 | 7/1959 | Manning | 355/54 |
| 2,925,752 | 2/1960 | Van Deusen | 355/54 |
| 3,230,823 | 1/1966 | Krassopoulos | 355/54 |
| 3,262,361 | 7/1966 | Alfonsi | 355/54 |
| 3,944,364 | 3/1976 | Petrini et al. | 355/74 |

FOREIGN PATENT DOCUMENTS

| 448,164 | 8/1927 | Fed. Rep. of Germany | 355/72 |
|---|---|---|---|
| 540,700 | 10/1941 | United Kingdom | 355/72 |
| 1,221,777 | 2/1971 | United Kingdom | 355/72 |

*Primary Examiner*—Donald A. Griffin
*Attorney, Agent, or Firm*—Huebner & Worrel

[57] ABSTRACT

A device for use with a photographic apparatus adapted to project an image, the device having a base dimensioned to receive a photographically sensitized sheet in fixed position; and a shield borne by the base for overlaying a sensitized sheet received on the base and having a flap portion movable between a first position in which the image can be projected on the flap portion for test purposes and a second position in which a portion of the sensitized sheet is exposed to the projected image.

4 Claims, 8 Drawing Figures

DEVICE FOR EXPOSING PHOTOGRAPHICALLY SENSITIZED SHEETS

BACKGROUND OF THE INVENTION

1. Field of the Invention

The present invention relates to a device for exposing photographically sensitized sheets and more particularly to such a device which permits photographic printers, enlargers and the like to be employed with precise control of the portions of photographically sensitized sheets which are exposed to the projected image so as both to conserve upon the quantities of such sheets required in the composing and test printing of photographs while providing the operator with the capability of utilizing a host of photographic refinements and techniques to achieve the optimum photographic result.

2. Description of the Prior Art

The printing or enlarging of a photograph from any given negative requires considerable skill, experimentation and artistic ability in order to produce a print which is of high quality both technically and artistically. Such factors as the focus, the selection of a color composition which is both accurate and pleasing, the selection of the area of the negative to be printed, the shape of the border, the length of exposure time, the light intensity, the size of the print and the like constitute factors which must be balanced and blended in order to achieve the optimum result. Many of these considerations translate in practice into still further considerations which must be contended with such as the selection of the appropriate photographically sensitized sheets or paper, the selection of the proper color filters, the selection of the proper developing chemicals and so on.

Because of the countless combinations which can be selected in an effort to achieve the optimum photographic effect, the photographic process, of necessity, requires considerable experimentation with these factors where the optimum result is desired. However, insofar as the applicant is aware no prior art device has been available which permits the operator adequately to experiment and to use to best advantage the multitude of refinements and techniques which can be employed in an effort to achieve this optimum result. Furthermore, the cost of photographically sensitized paper has become a factor which in itself limits the amount of composing which is feasible.

Therefore, it has long been known that it would be desirable to have a device for exposing photographically sensitized sheets which permits the photographer to use to optimum advantage, the various refinements and techniques available in composing a photographic print using a printing or enlarging device and which minimizes the quantity of photographically sensitized paper which must be employed during this composing process.

SUMMARY OF THE INVENTION

Therefore, it is an object of the present invention to provide an improved device for exposing photographically sensitized sheets.

Another object is to provide such a device which permits a photographer to use conventional printing and enlarging devices and other photographic equipment to optimum advantage.

Another object is to provide such a device which facilitates the operator's use of printing and enlarging devices by assisting in the composition process prior to final exposure of the sensitized paper.

Another object is to provide such a device which permits the operator to select to optimum advantage the focus, the color composition, the color filtration, the area of the negative or positive to be printed, the shape of the border, the length of exposure time, the light intensity, the size of the print and the like prior to exposing the sensitized paper.

Another object is to provide such a device which minimizes the quantity of photographic paper utilized in the composition process.

Another object is to provide such a device which permits the operator to compose a photograph on a target area prior to the exposure of any photographic paper and which thereafter permits the operator to expose photographic paper to the image composed during the composing process.

Another object is to provide such a device which permits the operator precisely and accurately to expose small areas of a sheet of photographic paper for purposes of testing the photographic composition selected so that all of a sheet of photographic paper can be used during the test operations thereby minimizing waste.

Another object is to provide such a device which assists in the use of texture screens, color filters and other light transmitting materials as well as the selection of unusual border shapes in composing a photograph using a given negative or positive.

Another object is to provide such a device which is adapted for use in a photographic darkroom.

Another object is to provide such a device which maintains the target area at substantially precisely the same distance from the point of projection of the photographic image during the composing process prior to exposure as the upper surface of the photographic paper at the time of exposure.

Still another object of the present invention is to provide such a device which can be adapted to a wide variety of usages and specific embodiments as most suited to the specific environment within which it is to be employed.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENTS

First Form

Figures 1, 2:
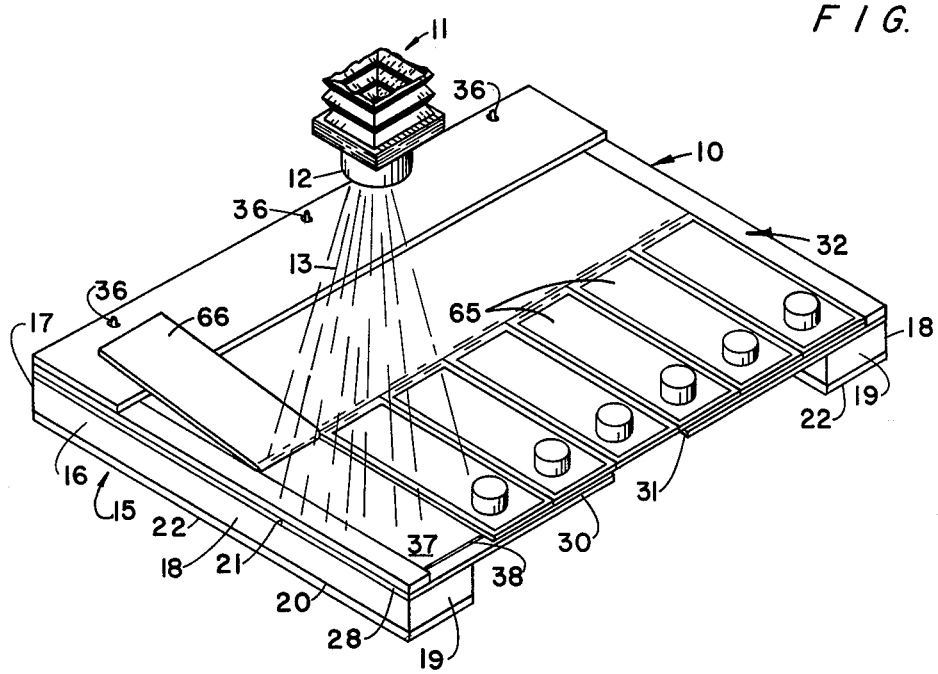
FIG. 1 is a perspective view of the first form of the device of the present invention shown in a typical environment beneath the projection portion of an enlarger which is shown fragmentarily.
FIG. 2 is a top plan view of the device of FIG. 1.

Referring more particularly to FIGS. 1 and 2, the device of the first form of the present invention is generally indicated by the numeral 10. As will subsequently become more clearly apparent, the device of the present invention lends itself to a variety of specific forms or embodiments which have advantages in certain specific areas of usage. The device 10 possesses perhaps the greatest flexibility of use and may be the form of the invention most suitable for normal photographic work.

The device 10 is shown in FIG. 1 in a typical operative environment in which an enlarger 11 is fragmentarily shown in an operative position over the device. It will be understood that the device 10 can be used with any suitable type of enlarger or printer. Commonly such devices possess the capability for retaining a negative or positive; adjusting the focus, F stop and projection point; mounting a variety of color filters; adjusting light intensity and exposure time and the like. It will be understood that all of these capabilities can be utilized by the operator in composing the image which he wishes to print. The enlarger has a projection point 12 which, in the conventional fashion, can be adjusted vertically to and from the device 10 for enlarging or reducing the size of the projected image. For illustrative convenience, lines 13 indicate the boundaries of an image being projected from the enlarger. The enlarger has an upwardly facing surface, not shown, on which the device of the present invention is adapted to be rested in spaced relation to the projection point 12.

The device 10 has a base, otherwise known as a holder or easel 15 which is designed to be rested on the support surface of the enlarger or a corresponding surface of a similar photographic apparatus. The holder has a U-shaped frame 16 composed of a cross piece 17 and a pair of leg portions 18 extending parallel to each other and at right angles to the cross piece adjacent to the opposite ends thereof. The leg portions have ends 19 remote from the cross piece. The frame has a substantially flat lower surface 20 extending on corresponding surfaces of the cross piece and leg portions and an upper surface 21 also extending on corresponding portions of the cross piece and leg portions substantially parallel to the lower surface. A pad 22, preferably constructed of rubber, a synthetic material, or felt, is mounted on the lower surface 20 of the frame so as to constitute a surface resisting movement of the frame along the support surface of the enlarger 11.

The holder 15 has a magnetically attractable plate or support 28 secured on the upper surface 21 of the frame 16 so as to cover the entire upper surface of the frame and the area bounded by the leg portions 18. The plate is preferably constructed of a magnetically attractive material such as iron or steel and has a substantially flat, upwardly facing display surface 29. The plate has a front edge 30 which extends between the remote ends 19 of the leg portions 18. A notch 31 is formed in the plate extending inwardly from the front edge of the plate, as best shown in FIG. 2.

A substantially U-shaped guide 32 is affixed on the magnetic plate 28 in covering relation thereto and substantially aligned with the U-shaped frame 16. The guide has a back portion 33 which is substantially parallel to the cross piece 17 of the frame and a pair of spaced, substantially parallel side portions 34 substantially parallel to the leg portions 18 of the frame. The side portions and back portion of the guide 32 are positioned and dimensioned so as to define a sheet receiving areas 35 which is preferably substantially identical to the standard size of a photographically sensitized sheet, except in one dimension as will hereinafter be described. Three pins 36 are fastened on the holder in equally spaced relation extending through the back portion 33, the plate 28 and into the cross piece 17 so as to mount the pins in upright attitude, as shown in FIG. 1, extending above the back portion of the guide 32.

For illustrative convenience a photographically sensitized sheet or paper 37 of the conventional type is shown in FIGS. 1 and 2 received on the display surface 29 of the magnetic plate 28 in a position suitable for exposing using the device 10. The sheet has a photographically sensitized surface 38 and an outer edge 39 which, when the sheet is positioned between the side portions 34 and against the back portion 33 within the area 35, is preferably spaced inwardly from the front edge 30 of the magnetic plate a distance of approximately ¼ of an inch (0.635 centimeters). Alternatively, as will become apparent, the device can be adapted to receive a continuous strip of sensitized paper fed from a roll across the support 28 as the paper is used.

The device 10 has a removable panel or shield 45 preferably constructed of a darkened and non-reflective sheet material such as a suitable fabric, paper, plastic, flexible magnetic sheet material, or the like. The shield, in any event, is of an opaque flexible material. The shield has side edges 46, which when the shield is mounted in its normal operating position on the device, are in individual abutting engagement with the inner edges of the side portions 34 of the guide 32. The shield has a front edge 47 which, when the shield is in position, coincides with the front edge 30 of the plate 28. The shield has an opposite rear edge 48 which, when the shield is in position, coincides with the back edge of the back portion 33 of the guide 32. Three holes 49 are extended through the shield in positions corresponding to those of the pins 36 so that the shield can be removably mounted on the holder 15 with the pins 36 individually extended through the holes of the shield. Where the shield is constructed of flexible magnetic material, "Flex Magnetic Sheet" sold by Edmund Scientific Company of Barrington, N.J. 08007 has been found well suited to the purpose.

The shield 45 is severed from its front edge 47 along equally spaced courses parallel to the side portions 34 of the guide 32 to a predetermined fold line 50. The fold line extends in right-angular relation to and between the side edges 46 of the shield to a position such that when a shield is positioned on the holder 15 and the sheet 37 is positioned in the receiving area 35, is substantially midway between the back portion 33 of the guide and the outer edge 39 of the sheet 37. Thus, a plurality of flap portions 51 are formed by severing the shield extending from the fold line 50 to the front edge 47 of the shield.

Each flap portion 51 has a target area 52 thereon. Each target area is of a rectangular configuration extending nearly to the edge of its respective flap portion and being preferably of a white coloration so as to contrast with the dark remainder of the shield. Thus, each flap portion has a target area which offers a surface capable of displaying an image projected thereagainst and which is bounded by a darkened border insuring that the flap portions can be visually distinguished under darkroom conditions. Each target area has a lower edge 53 which preferably coincides with the outer edge 39 of the sheet 37 when the sheet and shield are mounted on the holder 15, as shown in FIGS. 1 and 2. The thickness of each flap portion including the target area is preferably identical or closely similar to that of the sheet 37.

In some instances, it has been found desirable not to sever the shield 28 so as to form two or more of the flap portions 51. In these cases, the entire portion of the shield roughly below the pins 36 is used as, in effect, a single flap portion and bears a larger target area 52. It will be seen that the preferred size and number of the flap portions is controlled by the extent of the sensitized sheet 37 which is to be exposed.

A magnet 54 is mounted on each flap portion 51 of the shield in proximity to the front edge 47 thereof. Each magnet is magnetically attracted to the plate 28 so as to hold its respective flap portion in covering engagement with the plate when a sheet 37 is not received in the receiving area 35 and, alternatively, in covering engagement with the sheet 37 when the sheet is received in the receiving area. If desired, the magnets, which are used as handles; can be painted with fluorescent paint to aid visibility under darkroom conditions or can be painted with fluorescent numerals to assist in distinguishing them. It will also be seen that where a flexible magnetic sheet is employed as the shield no magnets need be used. In this case suitable handles constructed of wood, plastic, or the like are employed in place of the magnets.

A strip 60, constructed of a non-magnetically attractable material such as plastic, wood, or the like having three holes 61 extended therethrough in positions corresponding to those of the pins 36, is adapted to be received on the pins in overlaying relation to the shield adjacent to its rear edge 48. The strip is of a width permitting it to be engaged by the magnet 54 of any flap portion 51 of the shield which is folded back to the position shown on the left in FIG. 2. The strip is of course removable from the holder when desired by the operator.

For descriptive convenience it will be understood that each flap portion 51 is movable between a first attitude or position indicated at 65 in which the flap portion is in a down position and a second attitude or position 66 wherein the flap portion is folded backwardly so that the magnet 54 thereof is rested against the strip 60 and held out of magnetic attraction with the plate 28. Thus, as will be seen, the strip operates to retain the magnets out of attraction to the plate 28 so that the sensitized sheet 37 will not be scratched during insertion between the shield and the plate 28.

Second Form

Figure 4:
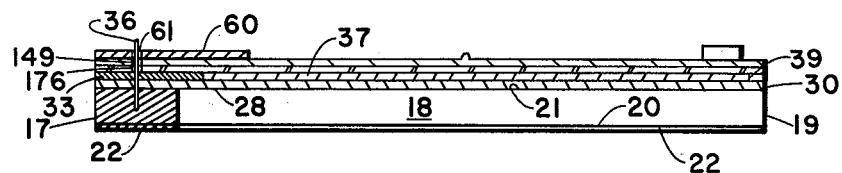
FIG. 4 is a transverse section taken on line 4—4 in FIG. 3.
Figure 3:
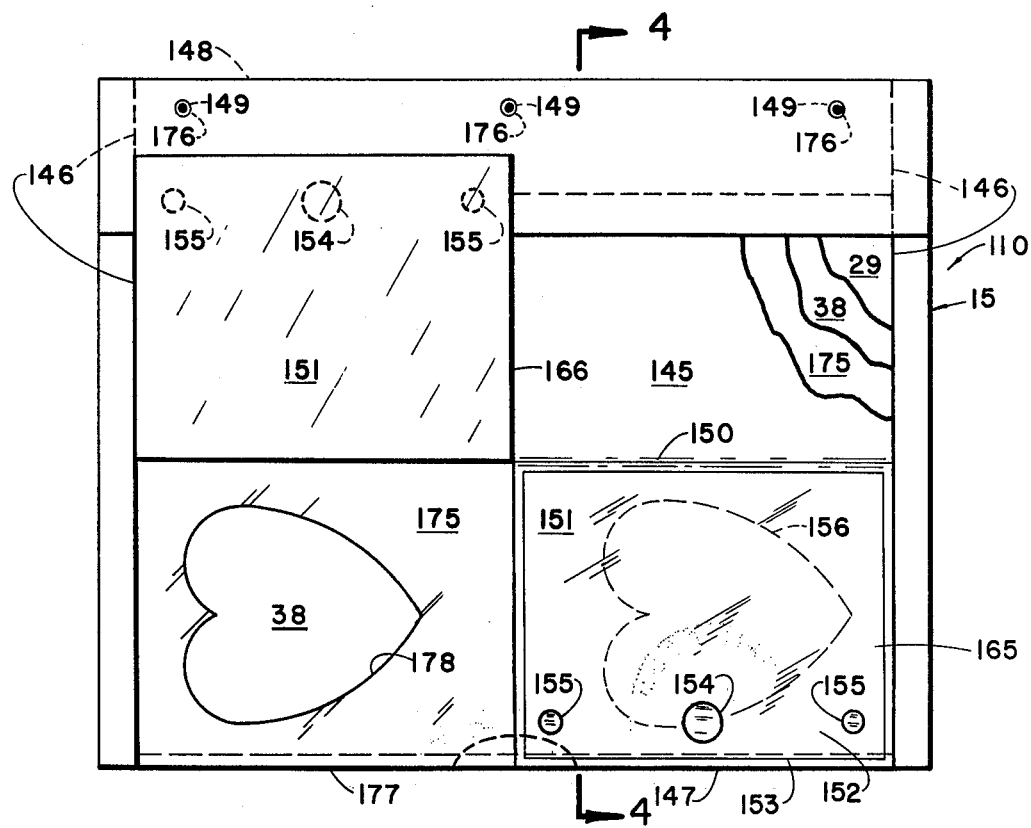
FIG. 3 is a top plan view of a second form of the device of the present invention using the same holder as that of the first form of the invention shown in FIGS. 1 and 2.

The second form of the device of the present invention is generally indicated by the numeral 110 in FIGS. 3 and 4. Device 110 is closely similar in structure to that of device 10.

It will be understood that the device 110 utilizes precisely the same holder 15 as employed in device 10 previously described. Device 110 also employs the same strip 60 of the device 10. In the interest of simplicity and ease of understanding, these identical structures are given the same identifying numerals and will not be further described.

Referring to the portions of the device 110 which are distinct from that of device 10, device 110 utilizes a removable panel shield 145. The shield 145 is constructed of darkened, opaque material and has opposite side edges 146 and parallel front and rear edges 147 and 148, respectively which correspond in size and arrangement to that of shield 45. Thus, the front edge 147 extends to the front edge 30 of the plate 28 and the side edges 146 extend to the side portions 34 of the guide 32 when the shield 145 is mounted in position on the holder. The shield has three holes 149 which are adapted individually to be received on the pins 36 of the holder to mount the shield in the position shown in FIGS. 3 and 4.

Similarly, the shield 145 has a central fold line 150 extending between the side edges 146 and which is preferably midway between the back portion 33 of the guide 32 and the outer edge 39 of the sensitized sheet 37 when the sheet is disposed in the receiving area 35. The shield is severed to form a pair of flap portions 151 of substantially equal size extending to the fold line 150. It will be seen that the flap portions 151 are several times larger than the flap portions 51 of device 10. Each of the flap portions bears a target area 152 of a substantially rectangular configuration extending nearly to the edges of the flap portion and having a suitably white surface capable of displaying a photographic image projected thereagainst. Each target area preferably has a lower edge 153 which substantially coincides with the position of the outer edge 39 of the sensitized sheet 37 when in position in the receiving area 35 of the holder. Each flap portion mounts a central magnet 154 and a pair of corner magnets 155 adjacent to the lower edge 153 of the target area 152. An outline of a heart 156 is inscribed substantially centrally within each target area. The inscription is formed by printing on the target area and need only be a line which is visible when an image is projected on the target area thereof under darkroom conditions, as will hereinafter be described.

As with the shield 45, the flap portions 151 of the shield 145 are adapted normally to be held in a first attitude or position 165 by the magnets 154 and 155 but are adapted to be folded backwardly to the second attitude or position indicated at 166 wherein the magnets are held out of engagement with the plate 28 by rested engagement on the strip 60.

The device 110 of the second embodiment has a special effect panel 175 which is also preferably formed of an opaque, darkened sheet material such as fabric, paper, plastic, flexible magnetic sheet material, or the like and has dimensions substantially identical to those of the shield 145 previously described. The panel has three holes 176 along one edge thereof in spaced relation for individual receipt about the pins 36 of the holder 15. The panel has a front edge 177 which coincides with the front edge 147 of the shield 145 when the panel and shield are mounted on the holder, as shown in FIGS. 3 and 4. The panel has a pair of heart shaped openings 178 extending therethrough in positions substantially precisely coinciding with the outlines 156 on the target areas 152 of the flap portions 151. The panel 175 is mounted in position on the pins 36 between the plate 28 and the shield 145 during use of the device 110, as will subsequently be described.

It will be understood that the outlines of the hearts 156 and the heart shaped openings 178 are merely representative of a wide variety of shapes and other special effects which can be incorporated in the panel 175 and overlaying shield 145 in place of or in additon to the shapes shown. Thus, shapes forming letters, numbers, stars, circles, rectangles, squares, triangles, ovals and the like can be employed. In addition, screens can be employed in the special effect panel to form writing across the photograph when printed such as for Christmas and birthday cards. The shield can also mount a greater number of smaller flap portions if desired in which case the number of openings 178 is correspondingly increased and they are positioned in individual alignment with the flap portions.

Third Form

Figure 5:
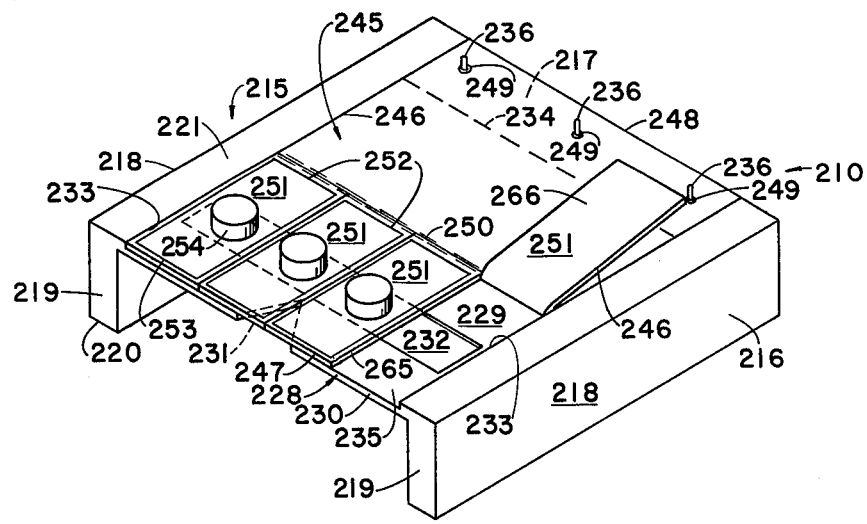
FIG. 5 is a perspective view of a third form of the device of the present invention.

The third form of the device of the present invention is generally indicated by the numeral 210 and is shown in FIG. 5. This form of the invention is intended for use with somewhat smaller photographically sensitized sheets and is additionally of importance in its simplicity of construction, low manufacturing cost and the facility of operation.

The device 210 has a base also known as a holder or easel 215 which is substantially similar to the holder 15 of the first and second forms of the invention with the exception that it is constructed almost entirely of a single casting of a suitable substance such as one of the many plastics now available. The holder has U-shaped frame 216 composed of a cross piece 217 with a pair of leg portions 218 integrally extending from the cross piece adjacent to its opposite ends and in substantially right-angular relation thereto. The leg portions 218 extend to remote ends 219. The frame has a substantially flat lower surface 220 and a substantially flat upper surface 221 which is parallel to the lower surface.

The holder 215 has an integral support 228 interconnecting the cross piece 217 and the leg portions 218 and extending outwardly to the remote ends 219 of the leg portions, as shown in FIG. 5. The support has a substantially flat display surface 229 which is disposed slightly below the upper surface 221 of the frame 216. The support extends to a front edge 230 interconnecting the remote ends 219 of the leg portions. A notch 231 is extended inwardly from the front edge of the support. It will be understood that the frame 216 and support 228 are an integral unit constructed preferably of suitable cast plastic material.

A narrow magnetically attractable plate 232 is mounted on the support 228 recessed slightly below the display surface 229 of the support parallel to and in predetermined spaced relation from the front edge 230 of the support. Spacing of the display surface 229 of the support below the upper surface 221 of the frame forms a pair of side edges 233 bounding the display surface and a back edge 234 interconnecting the side edges at substantially right angles thereto. So formed the frame and support thus form a sheet receiving area 235 which is adapted and receive a photographically sensitized sheet, not shown, whereupon the upper surface of the sheet is substantially coplanar with the upper surface 221 of the frame and the outer edge of the sheet is stepped inwardly from the front edge 230 of the support. Three pins 236 are mounted in upright relation on the cross piece 217 of the frame in predetermined spaced relation.

The device 210 of the third form of the invention has a removable panel or shield 245 which substantially corresponds to the shield 45 of the first and second forms of the invention in that it is suitably darkened and opaque. The shield has opposite side edges 246 which extend into abutted engagement with the side edges 233 of the holder 215 when the shield is mounted in the position shown in FIG. 5. The shield has a front edge 247 which coincides with the front edge 230 of the support 228 when the shield is mounted in position, as shown in FIG. 5. The shield has a rear edge 248. Three holes 249 are extended through the shield adjacent to the rear edge thereof positioned so as to be individually received about the three pins 236 for purposes of releasably retaining the shield on the holder 215. The shield has a fold line 251 which extends thereacross interconnecting the side edges 246 thereof and which is positioned so as to be substantially midway between the back edge 234 of the frame 216 and the outer edge of the photographic sheet when the shield and the photographic sheet are received in position on the holder. The shield is severed along substantially parallel, equally spaced courses to form a plurality of flap portions 251 extending to the fold line 250. Each of the flap portions mounts a target area 252 which is preferably white or of other light coloration so as to be suitable for displaying photographic image projected thereagainst. The target area is stepped just inwardly from the outer periphery of the flap portion to provide a darkened border and the target area has a lower edge 253 spaced inwardly from the front edge 247 of the shield and substantially coinciding with the outer edge of the photographic sheet when the sheet and shield are mounted in position on the holder 215. A magnet 254 is mounted on each flap portion in position to be disposed above the plate 232 when the shield is mounted in position on the holder 215.

As with the other forms of the invention, each of the flap portions 251 is adapted individually to be moved between a first attitude or position 265 in which the flap portion overlays the display surface 229 of the support 228 and a second attitude or position 266 in which the flap portion is folded backwardly with its magnet rested against the shield 245. It will be seen that with the device 210, the strip 60 does not need to be employed because the holder is constructed of a non-magnetic substance where it is engaged by the magnet 254 of any flap portion 251 in the second attitude 266.

Fourth Form

Figure 6:
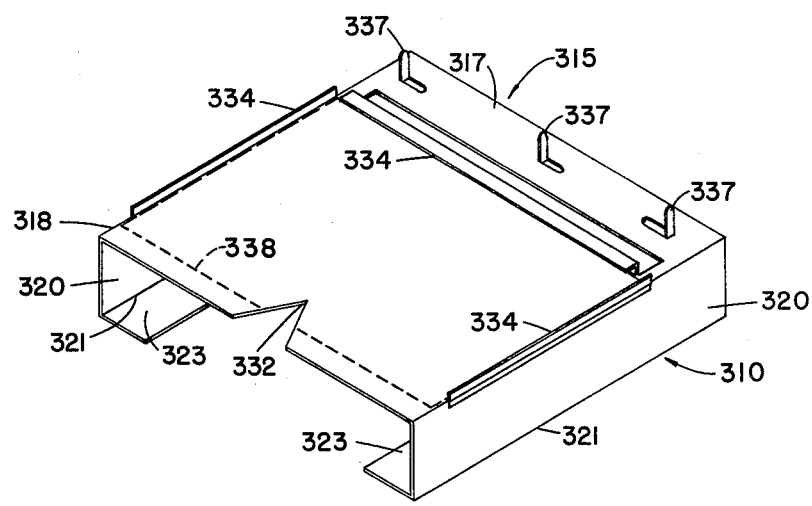
FIG. 6 is a perspective view of the fourth form of the device of the present invention.
Figure 7:
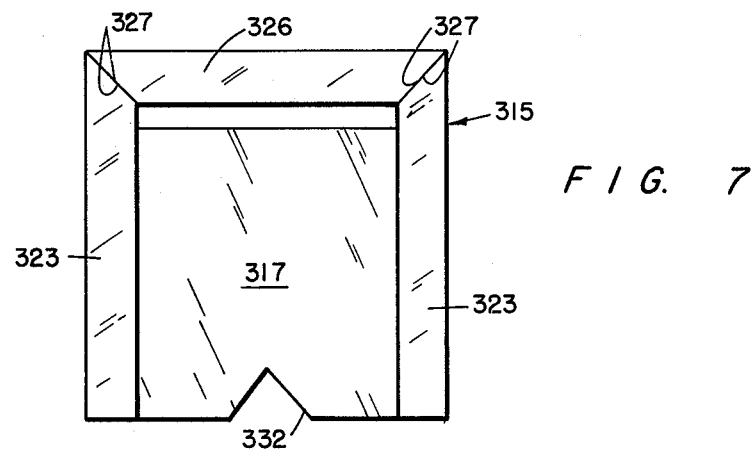
FIG. 7 is a bottom plan view of the device shown in FIG. 6.
Figure 8:
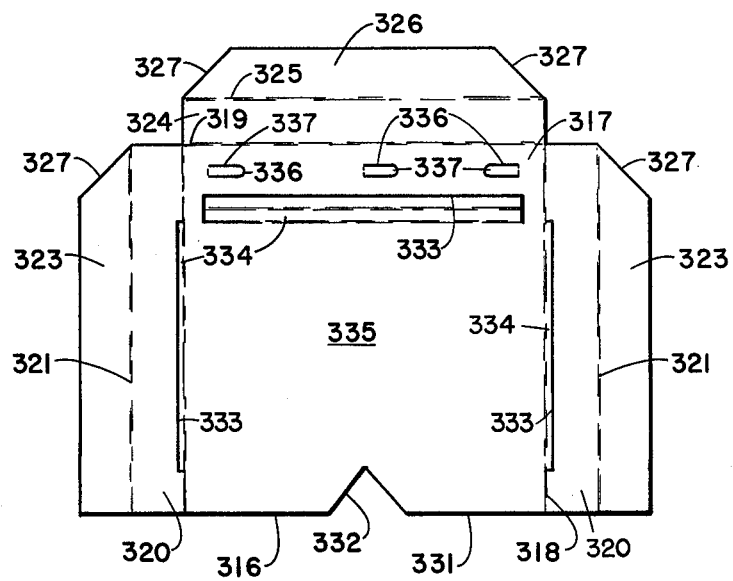
FIG. 8 is a plan view showing the device of FIGS. 6 and 7 prior to assembly.

The fourth form of the present invention is generally indicated by the numeral 310 in FIG. 6 and is additionally shown in FIGS. 7 and 8. The device 310 has a holder or easel 315 which is adapted to operate substantially the same as the holders 15, 115, and 215. However, the holder 315 is constructed in a somewhat different manner. The holder is formed from a sheet 316 of iron or steel or of other material which is magnetically attractable. The sheet has a central panel 317 which is bounded and thus deliniated by opposite side fold lines or courses 318 and an end fold line 319 right-angularly related to the side fold lines. The sheet has side panels 320 individually, integrally extending outwardly from the side fold lines 318 to fold lines 321. Bottom panels 323 individually, integrally extend outwardly from the fold lines 321.

An end panel 324 is integrally extended from the end fold line 319 to a fold line 325 which is parallel to the end fold line. A bottom panel 326 is integrally extended outwardly from the fold line 325. The bottom panels 323 and 326 have opposite beveled ends 327. The holder is formed from the sheet by folding the sheet along the fold lines 318, 319, 321 and 325 so as to position the beveled ends 327 of the bottom panels in abutted relation and dispose the end panels parallel to the central panel 317 and the side and end panels right-angularly related thereto and disposed therebetween. Thus the sheet is formed into the configuration shown in FIGS. 6 and 7.

The central panel 317 of the holder 315 has a front edge 331 having a notch 332 substantially centrally thereof and extended inwardly. The panel is severed along sever lines 333 along the side fold lines 318 and in a position extending between the side fold lines in spaced relation to the front edge 331 of the central panel to form three individual ridge portions 334 extending upwardly from the central panel, as best shown in FIG. 6, to define a sheet receiving area 335 equivalent to the sheet receiving areas 35, and 235 of the other forms of the invention. The ridge portion interconnecting the side fold lines 318 is of somewhat greater width than the other ridge portions and is bent so as to extend toward the front edge 331 of the central panel overhanging the sheet receiving area for receipt of a sensitized sheet between the panel and the ridge portion.

The central panel is additionally severed along three return bent lines or courses 336 in spaced relation to each other and the severed portions are bent upwardly to form pin portions 337. As is shown in FIG. 6, the holder is designed to receive a sensitized sheet between the ridge portions on the central panel in the position indicated at 338.

It will be understood that the device 310 is adapted to utilize the shields 45, 145, 245 and a special effect panel 175, as desired by the operator and as previously described with the other forms of the invention.

OPERATION

The operations of the described embodiments of the subject invention are believed to be clearly apparent and are briefly summarized at this point. Operation of the devices 10, 110, 210, and 310 are substantially the same in both principle and function and can conveniently be simultaneously described.

The shields 45, 145 and 245 are positioned on the holders 15, 215, and 315 with the holes 49, 149, and 249 disposed with the pins 36, 236 and 337 individually extended therethrough to mount the shields 45, 145 and 245 in covering relation to the display surfaces 29, 229 and, in the case of the device 310, the central panel 317. At this time, preferably the photographically sensitized sheets 37 are not positioned in the holders although they can be positioned in the receiving areas 35, 235 and 335 beneath the shields, if desired. The strips 60 are received in position on the pins of their respective holders overlaying their shields, as shown in FIGS. 1 through 4.

In the case of the device 110, the only variation involved is the positioning of the special effect panel 175 between the display surface 29 and the shield 145, as shown in FIGS. 3 and 4. As previously noted the special effect panel is mounted in position with the pins 36 individually extended through the holes 176 of the panel 175. The shield 145 is then positioned in covering relation thereto.

At this point in the operation of the devices 10, 110, 210, and 310, the flap portions 51, 151 and 251 are disposed in their respective first attitudes 65, 165 and 265. The enlargers 11 are then used under darkroom conditions to compose their projected images 13 on selected ones of the target areas 52, 152 and 252. As previously noted, this composition is accomplished by adjusting the focus, selecting the portion of the negative or positive to be reproduced, selecting the color composition, selecting the light intensity and so on. The lower edges 53, 153 and 253 of the target areas indicate to the operator the positions which will be occupied by the outermost edges of the sensitized sheets once they are positioned in the holders so that the operator is fully advised of the portions of the sheets which can be printed.

Once the projected images are composed to the operator's satisfaction, all of the flap portions 51, 151 and 251 of all of the devices are folded backwardly to their respective second attitudes 66, 166 and 266. The strip 60, on devices 10, 110 and 310 prevent the magnets 54, 154 and 254 from adhering to the magnetically attractable plates 28, 228 and central panel 317. The sensitized sheets 37 are then slidably deposited between the display surface 29, 229 and the central panel 317 and the shields and fully received within the sheet receiving areas 35, 235 and 335. Subsequently, all of the flap portions 51, 151 or 251 are folded back to the first attitudes 65, 165 and 265 except the flap portions on which the image has been composed. Thus, as can be visualized in FIGS. 1, 2, 3 and 5, the sensitized surfaces 39 of the sheets 37 are exposed in the areas on which the test image has been projected. It will be seen that since the sheets 37 were not in position at the time the flap portions were used for test projection of the image and since the flap portions are the same or nearly the same thickness as the sheets, the upper, sensitized surfaces of the sheets are substantially precisely the same distances from the projection points 12 of the enlargers 11 as were the target areas of the flap portions at the time images were composed. This operates to insure that such considerations as focus are duplicated as precisely as possible in the actual print. Subsequently, the enlargers 11 are operated in the normal manner to expose the sensitized surfaces 38 of the sheets 37 in the normal fashion for duplication of the composed images.

This process is repeated, of course under darkroom conditions, for the exposure of the portions of the sensitized sheets under each of the flap portions 51, 151 and 251. This includes removal of the sensitized sheets 37 prior to the test projection on the target areas 52, 152 and 252 to insure that the focal lengths are the same. When all of the flap portions have been employed in the manner described, the photographically sensitized sheets 37 can be removed and inserted in the reverse directions for exposure of the other halves of the sheets using the flap portions as previously described. Utilization of all of the area of each sheet in this manner is made possible by the fold lines 50, 150 and 250 extending across the centers of the sheets when in position so that they can be reversed without wasting any of the sheets.

In the case of the device 110, the overall process is substantially identical to that already described with the exception that the sensitized sheet is inserted between the plate 28 and the special effect panel 175, shown in FIGS. 3 and 4. The special effect panel permits the operator to achieve special effects such as producing heart shaped borders for the photographs using the heart shaped opening 178 of the special effect panel. As previously noted, other special effects can be used and the specific special effect panel 175 shown herein is merely intended to be representative of a wide variety of effects that can be achieved.

The purpose of folding the flap portions 51, 151 and 251 to the second attitudes 66, 166 or 266 is to assist in inserting the photographically sensitized sheets 37 under the shields 45, 145 and 245 and to prevent magnetic attraction of the magnets 54, 154 and 254 to the magnetic plates 28, 232 and central panel 317 which could result in scratching or otherwise damaging the sensitized surfaces 38 of the sheets 37. It will be seen that the device 210 presents much less of a hazard of damaging the sheet in view of the fact that it utilizes only the very narrow magnetic plate 232 which is recessed below the display surface 229.

Therefore, it will be seen that the device for exposing photographically sensitized sheets of the present invention is operable to permit the photographer to experiment with the composition of his photograph using a minimal quantity of photographically sensitized paper to achieve the optimum photographic effect in a device which is both easily operable and adaptable to a wide variety of photographic techniques.

Although the invention has been herein shown and described in what are conceived to be the most practical and preferred embodiments, it is recognized that departures may be made therefrom within the scope of the invention, which is not to be limited to the illustrative details disclosed.

Having described my invention what I claim as new and desire to secure by Letters Patent is:

1. A device for exposing photographically sensitized sheets comprising:
   A. a base having a substantially flat display surface with magnetically attractive portions and adapted to receive one of said sheets in facing engagement thereon;
   B. a shield having opposite edges and a fold line extending therealong substantially midway between said edges, said shield being severed from one edge along courses inwardly substantially to said fold line to form a plurality of flap portions independently foldable about the fold line and the shield being darkened with each of said flap portions having a target area of light coloration covering substantially all of the flap portion;
   C. means borne by the base for mounting said shield thereon in facing engagement with one of said sheets on the display surface leaving the flap portions thereof free to be folded independently from positions in facing engagement with said sheet to positions folded therefrom exposing the sheet; and
   D. magnetically attractive members individually borne by the flap portions remote from said fold line of the shield for magnetic attraction to said magnetically attractive portions of the display surface independently to secure said flap portions in facing engagement with the sensitized sheet sealed from exposure.

2. The device of claim 1 including a panel adapted to be secured by said mounting means in facing engagement with the sensitized sheet beneath the shield and having openings therein aligned with and individual to the flap portions of the shield for individually imparting a predetermined photographic affect by exposure of the sheet through said openings upon moving the flap portions individual thereto to the folded positions.

3. The device of claim 1 wherein the target area of each flap portion is a substantially white rectangle on which a photographic image can be composed and substantially corresponding to the area of the sensitized sheet which is exposed when the flap portion is moved to the folded position.

4. The device of claim 3 wherein the target area of each flap portion is bounded by a narrow darkened border to distinguish the target areas of the flap portions from each other under darkroom conditions.

* * * * *

UNITED STATES PATENT AND TRADEMARK OFFICE
CERTIFICATE OF CORRECTION

PATENT NO. : 4,108,548
DATED : August 22, 1978
INVENTOR(S) : Barbara Jean Hawkins It is certified that error appears in the above-identified patent and that said Letters Patent are hereby corrected as shown below:

Column 4, line 4, delete "areas" and substitute ---area---.

Column 7, line 56, delete "and" and substitute ---to---.

Signed and Sealed this

Twentieth Day of March 1979

[SEAL]

Attest:

RUTH C. MASON
Attesting Officer

DONALD W. BANNER
Commissioner of Patents and Trademarks